United States Patent [19]
Kobayashi et al.

[11] Patent Number: 5,236,784
[45] Date of Patent: Aug. 17, 1993

[54] BEARING MATERIAL AND PLASTIC BEARING

[75] Inventors: Toshihiro Kobayashi; Tokuhisa Tsutsui; Yuuki Nakamura, all of Nagano, Japan

[73] Assignee: Kabushiki Kaisha Sankyo Seiki Seisakusho, Nagano, Japan

[21] Appl. No.: 876,979

[22] Filed: May 1, 1992

Related U.S. Application Data

[63] Continuation of Ser. No. 427,091, filed as PCT/JP88/00119 on Feb. 9, 1988, abandoned.

[30] Foreign Application Priority Data

Feb. 9, 1987 [JP] Japan .................. 62-27579
Feb. 10, 1987 [JP] Japan .................. 62-29344
Apr. 28, 1987 [JP] Japan .................. 62-105645

[51] Int. Cl.$^5$ .................. C04B 35/22; C10M 7/30
[52] U.S. Cl. .................. 428/408; 428/323; 428/457; 428/908.8; 252/12; 252/12.2; 523/468; 523/512; 524/265; 524/496; 384/907; 384/907.1; 384/908; 384/909; 384/910
[58] Field of Search .............. 428/408, 323, 447, 327, 428/908.8, 457; 252/12, 12.2; 523/468, 512; 524/496, 265; 384/907, 907.1, 908, 909, 910; 423/445

[56] References Cited

U.S. PATENT DOCUMENTS

| | | | |
|---|---|---|---|
| 3,854,979 | 12/1974 | Rossi | 428/468 |
| 3,908,038 | 9/1975 | Nienart et al. | 252/12 |
| 3,909,424 | 9/1975 | Clark | 252/12 |
| 3,926,818 | 12/1975 | Albertson et al. | 252/12 |
| 4,098,967 | 7/1978 | Biddick et al. | 429/210 |
| 4,376,710 | 3/1983 | Gardas et al. | 252/12 |
| 4,486,320 | 12/1984 | Sakurai et al. | 252/12 |
| 4,532,054 | 7/1985 | Johnson | 252/12 |
| 4,661,462 | 4/1987 | Kishine et al. | 428/523 |
| 4,716,078 | 12/1987 | Kishine et al. | 428/408 |
| 4,815,606 | 4/1989 | Koyama et al. | 428/323 |
| 4,955,995 | 9/1990 | Yamauchi et al. | 252/504 |
| 4,958,998 | 9/1990 | Yamauchi et al. | 423/445 |

FOREIGN PATENT DOCUMENTS

| | | |
|---|---|---|
| 5989824 | 5/1984 | Japan . |
| 59-131567 | 7/1984 | Japan . |
| 60-131816 | 7/1985 | Japan . |

*Primary Examiner*—Ellis P. Robinson
*Assistant Examiner*—A. A. Turner
*Attorney, Agent, or Firm*—Gordon W. Hueschen

[57] ABSTRACT

A bearing material mainly comprising plastics and a plastic bearing made thereof. The bearing material is composed of 30 to 98 wt % of glassy carbon and 70 to 2 wt % of plastics, and has persistent, excellent abrasion resistance, sliding properties, and heat resistance.

1 Claim, 3 Drawing Sheets

BEARING MATERIAL AND PLASTIC BEARING

This is a continuation of application Ser. No. 07/427,091, filed Aug. 4, 1989, now abandoned, which is the national stage application based on PCT/JP 88/00119, filed Feb. 9, 1988.

FIELD OF THE INVENTION

The present invention relates to a bearing material and a bearing using thereof. More particularly, it relates to a bearing material which mainly comprises plastic and a plastic bearing which uses said material at least on its sliding face part.

BACKGROUND OF THE INVENTION

It is known a type of bearings, so called plastic bearing, which is made of plastic such as polyamide resin, phenol resin, or polyphenylene sulfide mixed with a modifier such as graphite, carbon fiber, glass fiber, metal powder or carbon black (refer to, for example, S. Yamaguchi; Lubricity of Plastic Materials, Nikkan Kogyo Shimbun). Such plastic bearings are widely used for their easy maintenance as they require no lubrication.

These plastic bearings vary in their characteristics depending on the type and amount of modifier blended to plastic matrix. Different modifiers are used depending on their purposes such as wear resistance, slidability (frictional characteristics), and heat resistance.

Addition of carbon black, for example, for the purpose of improved wear resistance, however, often deteriorates the slidability significantly. Addition of expansive graphite that is excellent in lubricity and lubricant absorbency, for the purpose of improved slidability, on the other hand, results in inferior wear resistance. Addition of metal powder for the purpose of improved heat resistance may result in degraded slidability. In the conventional plastic bearings, an attempt to improve a given property inevitably results in degradation of another property due to defects of a modifier added and it was difficult to attain a high level in all of the required characteristics such as wear resistance, slidability and heat resistance. In fact, there was no modifier which could meet the requirements by itself.

Moreover, the conventional plastic bearings are usually supported by a metal holder or a housing. When a plastic bearing is press-fitted or inserted to a metal holder, plastic becomes contracted or deformed due to the pressing force, and eventually the bore dimension becomes altered by a great margin, causing a significant deterioration in the bearing function. Plastic blended with an inorganic modifier such as graphite, carbon fiber, glass fiber, metal powder, or carbon black at a high content tends to generate contraction of the bore size as well as cracks in the form of bearings due to pressing. The cracks would result in tearing of the sliding face to thereby accelerate wear. Even if improved wear resistance, slidability (low friction coefficient) and heat resistance could be achieved in terms of the composition by addition of modifiers, such characteristics might be offset by dimensional errors or cracks occurring during the manufacturing and processing steps. In the end, the bearing function itself would become deteriorated. There is known a sliding member made of vitreous carbon material which contains a solid lubricant graphite (JPA Laid Open No. Sho 59-131567). However, a mixture of vitreous carbon material and graphite is sintered and carbonized to form a sliding member material, and a significant contraction occurs at the time of sintering and carbonizing of the mixture. Moreover, as the fluctuation in the degree of contraction is significant, it is impossible to obtain bearings with satisfactory size precision.

DISCLOSURE OF THE INVENTION

An object of the present invention is to provide a bearing material which exhibits excellent characteristics in wear resistance, slidability and heat resistance by addition of only one modifier to matrix.

Another object of the present invention is to provide a bearing material in which vitreous carbon as the modifier is retained for an extended period of time. In other words, the present invention aims to provide a bearing material which retains high wear resistance, high slidability and high heat resistance for an extended period of time.

Still another object of the present invention is to provide a plastic bearing which is uniquely superior in the wear resistance, slidability or heat resistance and which is excellent in the product precision despite simplified manufacturing and processing steps.

In order to achieve these objects, the plastic bearing according to the present invention is made of a bearing material which comprises 30 to 98% of vitreous carbon and 2 to 70% of a plastic, by weight.

The content of vitreous carbon in the bearing material according to the present invention is preferably between 50 and 95% by weight, more preferably between 50 and 90% by weight, and still more preferably between 60 and 80% by weight, but the most preferable content is approximately 70% by weight.

In a preferred embodiment, the vitreous carbon in the bearing material is characterized in a spherical powder shape.

Further, the vitreous carbon preferably possesses the mean grain size of up to 30 $\mu$m.

In another embodiment of the present invention, the bearing material further contains, a surfactant and/or coupling agent.

Still further, the bearing material of the present invention may contain a lubricant in addition to said surfactant and/or coupling agent.

A silicone base surfactant as the surfactant to be used In the present invention is preferably.

In order to achieve the above objects the plastic bearing according to the present invention comprises a plastic layer molded integrally with the inner periphery of a holder and made of the bearing material containing 30–98% of vitreous carbon and 70 to 2% of a plastics by weight, with the inner periphery of said plastic layer acting as the sliding face to a rotary shaft.

Vitreous carbon to be used in the present invention means amorphous carbon which may be obtained, for example, by curing and carbonizing at an extremely gradual rate a thermosetting resin such as one of phenol resins and furan resins. There are no limitations as to the vitreous carbons, but conventionally, they are manufactured by the known method such as disclosed in JPA Laid Open Nos. Sho 61-48410. Sho 60-131816, Sho 59-131567, and "Carbon Material Engineering"(Nikkan Kogyo Shimbun, Dec. 23, 1985, pp. 50–54) as a fine powder of spherical or crushed particles of up to 30 $\mu$m. There are also no limitations as to the plastic to be used in the present invention. Any known plastics used as the material for bearings may be selected to meet the requirements of the intended application such as motors. For example, in the case of a stepping motor where wear resistance is of a particular importance, one of phenol resins is more preferable.

In the present invention, the vitreous carbon content is between 30 and 98% by weight and the plastics between 2 and 70% by weight. The lower limit of the plastics is specified to be not less than 2% by weight, or the content of the vitreous carbon to be below 98% by weight because if the content of the plastics is less than 2% by weight, moldability of the plastic bearing will be impaired. On the other hand, if the vitreous carbon content exceeds 95% by weight, bonding between the vitreous carbon and the plastic becomes weakened and the vitreous carbon particles tends to slip off from the plastic matrix to deteriorate the wear resistance. Despite the foregoing, however, the resultant product will exhibit better wear resistance as a whole when compared with the conventional products. The content of the vitreous carbon is preferably between 50 and 95% by weight, more preferably between 50 and 90% by weight, still more preferably between 60 and 80% by weight, and the most preferably approximately 70% by weight.

Compared to conventional plastic bearings, the present invention bearing material has less wear, long life, no risk of seizure, improved slidability and heat resistance, and less dimensional changes due to temperature change during use or molding. As only one modifier, or vitreous carbon, is to be blended to the plastic, the manufacturing cost can be reduced as well.

As the vitreous carbon is made spherical in the present invention, the resultant bearing will not harm the shaft and improve sliding performance.

By limiting the mean particle size of the vitreous carbon to 30 μm or less, the ratio of vitreous carbon area contacting the shaft or the dimensional accuracy of the product bearing improves.

Addition of a surfactant in the bearing material causes an improvement on the wettability of the plastics with the vitreous carbon, followed by increasing in the adhesion strength of the plastic to the vitreous carbon. Further, when a surfactant is added to the bearing material, an enhancement of the chemical bonding between the plastic and the vitreous carbon are caused by the coupling agent, resulting in intensified adhesion between the plastics and the vitreous carbon. Thus, the vitreous carbon is prevented from falling off, and high slidability, heat resistance and wear resistance can be maintained for a long time.

When a silicone base surfactant is used as the surfactant for the plastic bearing of this invention, the adhesion between the plastic and the vitreous carbon can be improved because of getting a smaller surface tension.

Further, in the plastic bearing according to this invention, addition of a lubricant will improve the wear resistance.

Unlike the prior art wherein commercially available premolded plastic bearings are press-fitted or inserted in a holder, the bearing material of the present invention is compression-molded into a bearing member using the insert molding technique. The inner periphery of the bearing member acting as the sliding surface will therefore manifest no dimensional changes, nor will the properties of the blended modifier be impaired. Production of the bearing will also be simplified, and the resultant product will have a firm adhesion between the holder and the plastic layer comparable to that of the press-fitted bearings.

PREFERRED EMBODIMENTS OF THE INVENTION

Figure 1:
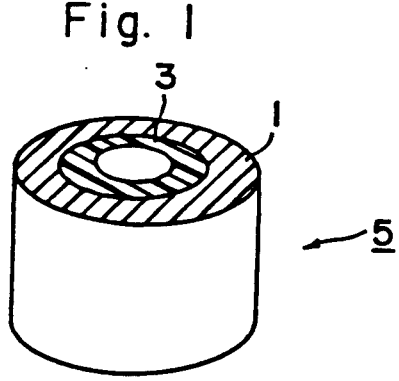
FIG. 1 is a perspective view showing an embodiment of the plastic bearing according to this invention.

This invention will now be described in detail based on embodiments.

The plastic bearing material according to this invention comprises 30-98% of vitreous carbon and 70-2% of a plastic by weight.

The matrix plastic used in the plastic bearing material according to this invention may include various thermoplastic resins, for example, polyamides, polyacetal, polyarbonate, polyphenylene sulfide, polyphenylene oxide, polysulfone, polyether sulfone, imide type resins such as polyether imide and polyamide imide, ketone type resins such as polyether ketone, polyether ether ketone, polyether ketone ketone, fluorine containing type resins such as polytetrafluoroethylene, polyvinylidene fluoride, polyhexafluoroethylene, polytrifluoro trichloroethylene, polyvinylidene fluoride, polyester resins such as polyethylene terephthalate, polybutylene terephthalate, various known thermosetting resins such as epoxy resins, phenol resins, urea resins, alkyd resins, melamine resins, silicone resins, and all the other plastics that can be used as the material for bearing.

In the plastic bearing material according to this invention, the plastic is contained in the range of 2-70% by weight, preferably 10-50% by weight, more preferably 20-40% by weight, and most preferably approximately 30% by weight, although the content may vary depending on the kind of the plastic. In other words, if the content of the plastic is less than 2% by weight, it becomes difficult to form the matrix by the plastic. At the same time, adhesion between the vitreous carbon and the plastic becomes weakened and the vitreous carbon tends to slip off from the plastic matrix to deteriorate the wear resistance, lowering the mechanical strength as well as moldability. On the other hand, if the content of the plastic exceeds 70 wt %, the content of vitreous carbon inevitably decreases, and improvements of the wear resistance, slidability and heat resistance by the composite structure may not be achieved.

Vitreous carbon to be added to the plastic as the modifier according to this invention may include an amorphous carbon obtained by very gradually curing and carbonizing a thermosetting resin such as one of furfuryl alcohols, furan resins and phenol resin, or a sugar, a cellulose, or polyvinylidene chloride. Its morphological features and typical properties include specific gravity of 1.45–1.50 g/cm$^3$; hardness of 100–110 Hs; 900–1,300 Hv; resistivity of $5 \times 10^5$–$10 \times 10^5$ Ω/cm; and thermal conductivity of 0.01–0.2 cal/cm·sec·°C. Thus, the vitreous carbon has a high hardness, and is excellent in the wear resistance, slidability and heat resistance.

To obtain such vitreous carbon, a thermosetting resin such as partially cross-linked phenol resin is pulverized by a granulation method such as spray-drying or suspending, and then sintered for 48 hours at 500°–2,500° C., preferably at least 1,000° C. However, the method for the manufacture of the vitreous carbon is not limited to above, and any one of known methods described in JPA Laid Open Nos. Sho 61-48410. Sho 60-131816, Sho 59-131567 may be used. The vitreous carbon can also be obtained by sintering at lower temperatures. The resultant vitreous carbon in this case has a porous structure, and the wear resistance, slidability and heat resistance may be improved by impregnating the pores with oil such as heat-resistant grease.

The vitreous carbon may be a powder of differently shaped particles, spherical particles or irregular and rugged particles. For slidability, spherical particles are desirable while irregular and rugged particles may be preferable for preventing the carbon from falling off because of the anchoring effect itself. The particle size of the vitreous carbons is preferably not more than 30 μm on the average, and more preferably 1–30 μm. In other words, if the particle size is larger than 30 μm, it becomes difficult to uniformly disperse the particles in the plastic matrix while if it is smaller than 1 μm, the surface area of the vitreous carbon becomes so small that adhesion deteriorates. Further, when the content of the vitreous carbon is not less than 80% by weight, it is preferable to use finely pulverized vitreous carbon of up to 5 μm. Compared with vitreous carbon particles of comparatively large size of 10–30 μm, finely pulverized vitreous carbon exhibits increased adhesion to the plastic matrix because of the larger contacting surface area and is prevented from falling off from the matrix. Since it can be tightly packed, the mold shrinkage factor becomes small, resulting in excellent wear resistance, slidability and heat resistance. If a mixture of finely pulverized particles not more than 5 μm and those of 20 μm is used to mold bearings, a substantially similar effect is obtained. The most preferable range of the vitreous carbon content has been found to be 85–90% by weight. This result indicates that use of vitreous carbon containing finely pulverized particles as at least a part improves the flowability during molding and ensures smooth molding of bearings with a high dimensional accuracy. It also strengthens the adhesion with the plastics and prevents the carbon from slipping off, and achieves excellent wear resistance, slidability and heat resistance. In the modified example mentioned above, the size of the larger particles is set at 20 μm, but the size is not limited to 20 μm so long as the powder of vitreous carbon contains fine particles.

In the present invention plastic bearing material, such vitreous carbon is added in an amount ranging from 30 to 98% by weight. The modifying effect of vitreous carbon for plastics is not satisfactory when the addition is less than 30% by weight, whereas when it exceeds 98% by weight, formation of plastic matrix becomes difficult and mechanical strength, adhesion may be deteriorated.

A surfactant and/or coupling agent may be, if necessary, added to the present invention plastic bearing material. Surfactants to be used in the invention include various anionic, cationic, amphoteric and nonionic surfactants of organic and silicone bases, but the silicone base surfactant is more preferably used. The amount of surfactant addition is from 1 to 7% as against the total amount of the vitreous carbon and the plastic by weight, and is to be determined on the basis of weight percent of the vitreous carbon contained. Azo coupling agent and silane coupling agent may be used as the coupling agent in an amount ranging from 1 to 7% as against the total amount of the vitreous carbon and the plastic by weight.

The bearing material according to this invention may further be added with a lubricant, if necessary. As the lubricants, various types of oils and greases mainly consisting of synthetic oil may be used, but diester group liquid greases and urea group greases are more preferable. The amount of the lubricant is from 5 to 20% by weight, and more preferably between 5 and 10% by weight.

Fluorine containing plastics such as polytetrafluoroethylene (Teflon TM, PTFE) or molybdenum disulfide may also be added at the time of molding the bearings.

The present invention will now be described further detail referring to examples.

Example of Production of Vitreous Carbon

To obtain amorphous carbon, partially cross-linked phenol resin is formed as the starting material. Partially cross-linked phenol resin is formed by partially cross-linking a powder of phenol-novolac resin, and possesses in its molecule some phenolic hydroxyl groups which cure phenol/novolac resin as well as some methyrol group which show self-condensation property. The representative properties are as follows:

| | |
|---|---|
| Specific gravity | 1.25 gr/cm$^3$ |
| Apparent specific gravity | 0.3 gr/cm$^3$ |
| Mean particle size | 5–30 μm |
| Solubility | |
| High solubility | N-methyl-2-pyrolidone |
| | dimethylformaldehyde |
| | methylcellosolve |
| | isobutyl carbitol |
| Low solubility | tetrahydrofuran |
| | acetone |
| | methyl ethyl ketone |
| | toluene |
| | xylene |
| | trichloroethylene |
| | methanol |
| Softening point | 130° C. |
| Gelation time | 180–220 sec/150° C. |

Partially cross-linked phenol resin thus formed is solved with a material listed above as having a high solubility. The resultant resin solution is sprayed into a non-solvent or a solvent and further subjected to drying in vacuum or by heating to obtain a powder. The powder is then heated for calcination in nitrogen gas stream from room temperature to 1000° C. in 48 hours. Vitreous carbon in spherical particles with the mean particle size of from 5 to 30 μm having the physical properties as shown below was obtained. The experiments conducted by the inventors have shown that the affinity between the vitreous carbon and the plastics, i.e. the strength of the molded plastic bearing, becomes greater when the heat treatment is conducted as near as 500° C.; that the slidability of the bearing is greater when the heat treatment temperature is as high as 2500° C.; and that adsorption of gas, oil or the like is the highest when the heat treatment temperature is approximately 800° C. and lowers as the temperature reaches nearer to either 800° C. or 2500° C. Therefore, by changing the heat treatment temperature within the range of from 500° to 2500° C., bearings with certain degree of desirable affinity, slidability and adsorption can be obtained.

| Specific gravity | 1.45–1.50 gr/cm$^3$ |
| --- | --- |
| Hardness | 100–110 Hs |
| | 900—1300 Hv |
| | (Dependent of calcination condition) |
| Resistivity | $(5-10) \times 10^{-5} \Omega-cm$ |
| Thermal conductivity | 0.01–0.02 cal/cm · sec · °C. |

Shrinkage by volume at the time of sintering is about 17%, which increases crosslink density and thus improves heat resistance.

Molding of Bearing Member

Using the vitreous carbon thus prepared as the modifier, bearings are molded in the following manner.

Above mentioned plastic, vitreous carbon and other additives such as a surfactant, a coupling agent and/or a lubricant as required are blended together and throughly kneaded until they are uniformly dispersed.

Figure 2:
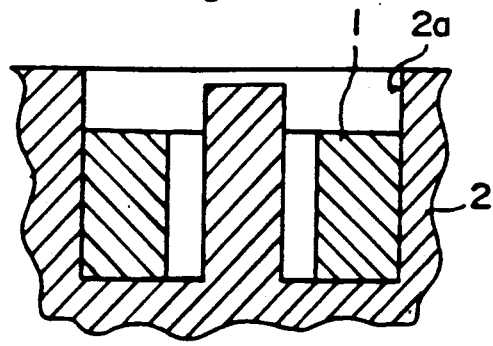
FIGS. 2, 3, and 4 are the explanatory views to show the insertion process, the charging process and pressurization/heating process respectively for the molding of the bearing shown in FIG. 1.
Figure 3:
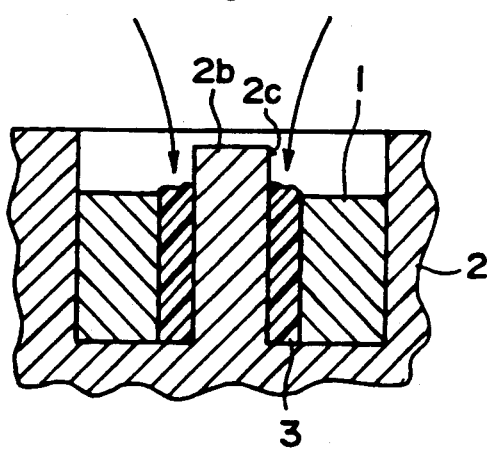

As shown in FIG. 2, a holder made of a metal cylinder is inserted in the cavity of a lower die 2 coated on its surface with a mold lubricant in a manner such that the outer periphery of the holder 1 closely contacts the inner periphery 2a of the lower die 2 (insertion step). As shown in FIG. 3 with arrows, a complex of the vitreous carbon obtained as above and the plastic, i.e. the bearing material 8, is then charged in the space formed between the outer periphery 2c of the cylinder 2b provided at the center of the lower die 2 and the inner periphery of the holder 1 (charging step).

Figure 4:
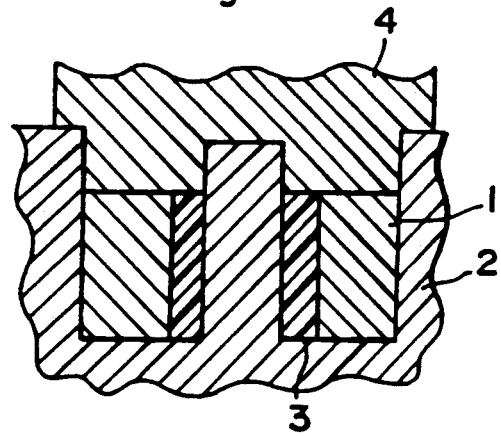

FIG. 4 shows the step where a upper die 4 coated on its surface with a mold lubricant is set and clamped at the pressure of, for example 50 kg/cm$^2$, and maintained at 150° C. for 20 minutes to effect so-called insert molding of the complex 3 in the holder 1. The molding is subsequently removed from the dies with ease because of the mold lubricant, and a radial bearing member 5 which also has functions as a bearing housing is obtained as shown in FIG. 1. It is noted that a female and a male dies (not shown) such as a cylinder and a piston which engage with each other very tightly may also be employed in the pressurization step.

Structure of the Plastic Bearing

Figure 9:
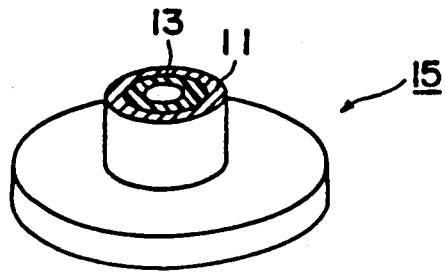
FIG. 9 is a perspective view of a modified embodiment of the plastic bearing according to the present invention.
Figure 10:
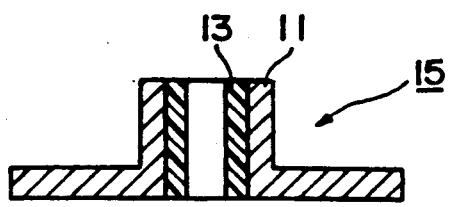
FIG. 10 shows a vertical cross sectional view of FIG. 9 at the center.
Figure 11:
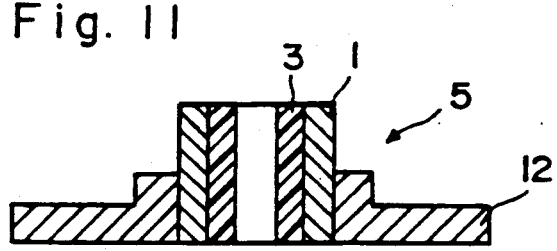
FIG. 11 is a cross-sectional view of the plastic bearing shown in FIG. 1 press-fitted into a housing.
Figure 12:
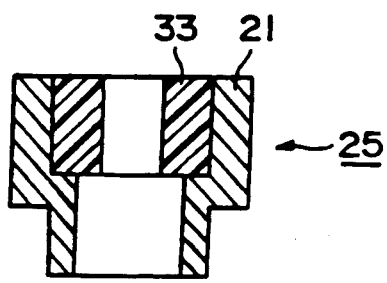
FIG. 12 is a center vertical cross-sectional view of the plastic bearing having a complicated holder and molded according to the present invention.
Figure 13:
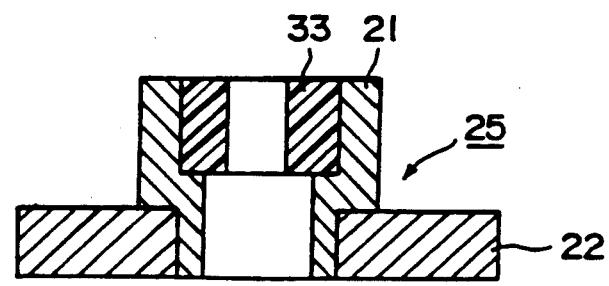
FIG. 13 is a center vertical cross sectional view of the plastics press-fitted into a housing.
Figure 14:
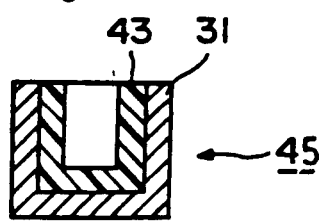
FIG. 14 is a cross-sectional view of the plastic thrust bearing molded according to this invention.
Figure 15:
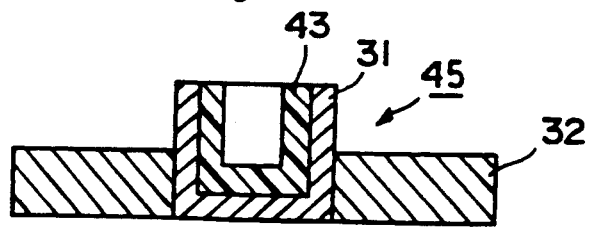
FIG. 15 is a center vertical cross-sectional view of the plastic bearing shown in FIG. 14 press-fitted into the housing.

Plastic bearings may have different shapes and structures depending on the use. For example, FIG. 1 shows a bearing 5 in which the complex 3 is insert molded in the inner periphery of the cylindrical holder 1. FIGS. 9 and 10 show a plastic bearing 15 in which a complex 13 is directly insert-molded in a stepped housing 11 such as a small motor. In FIG. 11, the cylindrical plastic bearing 5 obtained by insert molding and shown in FIG. 1 is press-fitted or inserted in a cylindrical housing 12 to receive a rotary shaft on its inner periphery. Because of the double layer structure where the more vulnerable inner layer 3 is protected by the outer metal holder, the strength of the plastic bearing as a whole is increased and there hardly occurs any change in the bore dimension even by press-fitting. For the same reason, the structure shown in FIG. 12 can be adopted, in which a metal holder 21 has a complicated shape with stepped inner and outer peripheries. The plastic bearing shown in FIG. 12 is obtained by insert-molding a complex 33 inside the metal holder 21 only in the portion which contacts the rotary shaft. The bearing 25 is then press-fitted or inserted in a housing 22. This structure is advantageous in that because of the steps, the bearing 25 can be easily attached and positioned in the housing 22. Further, as there is no need to press-fit the plastic layer, it is applicable to holders having a complicated shape such as that shown in FIG. 12. FIG. 14 shows thrust bearing 45 wherein a complex 43 is insert-molded inside a cylindrical holder 31 which is closed on its one side. For the same reasons as mentioned above, the complex 43 may be press-fitted or inserted in a housing 32 as shown in FIG. 15. It is also possible to insert-mold a complex along the inner periphery of a means such as a threaded nut. In this case, the thread is effective in enhancing the adhesion with the plastic.

Figure 16:
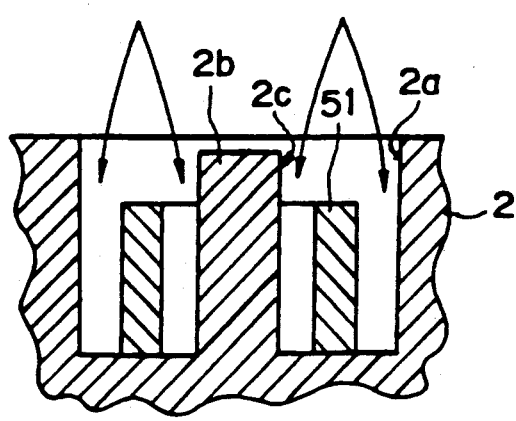
FIG. 16 is a view to illustrate insert molding of the plastic in the outer/inner peripheries of the holder.

For increasing the strength of the bearing as a whole, the structure shown in FIG. 16 is preferable. In the figure, a metal holder 51 is placed inside the lower die 2 in a manner such that the holder does not contact the inner periphery 2a of the lower die 2 and the outer periphery 2c of a projected portion 2b. The plastic complex is charged in a space formed in the tool shown by the arrows to obtain a bearing comprising the metal holder 51 surrounded by the plastic complex both at the inner and outer peripheries. For the same reasons, a plastic bearing having a spring insert-molded in the plastics is also preferable.

Although the holders in the foregoing description are of metal, they may be ceramics. Because of the two-layer structure, the plastic layer thickness can be reduced to minimize the effect of thermal expansion.

Although the samples in the foregoing examples ar compression-molded using the insert-molding technique, other methods such as injection- and transfer-molding can be employed so long as the insert-molding technique is incorporated.

EXAMPLE 1

A bearing member was molded by the method mentioned above using 70% by weight of vitreous carbon powder with the mean particle size of 10–20 μm and 30% by weight of epoxy resin.

EXAMPLE 2

A bearing member was molded by the same method as in Example 1 except the content of vitreous carbon was modified to 90% by weight and that of epoxy resin to 10% by weight respectively.

EXAMPLE 3

A bearing member was molded by the same method as in Example 1 except the content of vitreous carbon was modified to 90% by weight and that of epoxy resin to 50% by weight respectively.

EXAMPLE 4

A bearing member was molded by the same method as in Example 1 except the content of vitreous carbon was modified to 40% by weight and that of epoxy resin to 60% by weight respectively.

EXAMPLE 5

A bearing member was molded by the same method as in Example 1 except the content of the vitreous carbon was modified to 30% by weight and that of the epoxy resin to 70% by weight respectively.

COMPARATIVE EXAMPLE 1

A bearing member was molded by the same method as in Example 1 except that 30% by weight of polyphenylene sulfide was blended with 30% by weight of carbon fiber and 40% by weight of an inorganic substance as modifiers.

COMPARATIVE EXAMPLE 2

A bearing member was molded by the same method as in Example 1 except that 30% by weight of epoxy resin was added with 70% by weight of a solid lubricant such as graphite as a modifier.

COMPARATIVE EXAMPLE 3

A bearing member was molded by the same method as in Example 1 using epoxy resin alone.

Following tests were conducted on five samples according to the present invention and three comparative samples using stainless steel (SUS) rotary shaft housed in the samples.

| Wear Resistance Test | |
|---|---|
| Shaft load | 1 kgf/cm$^2$ |
| Shaft rotational speed | 5 m/min |

The shaft inverted at every two rotations.

The shaft was rotated under the above conditions to measure time course changes of the bore dimension of the bearings.

Figure 5:
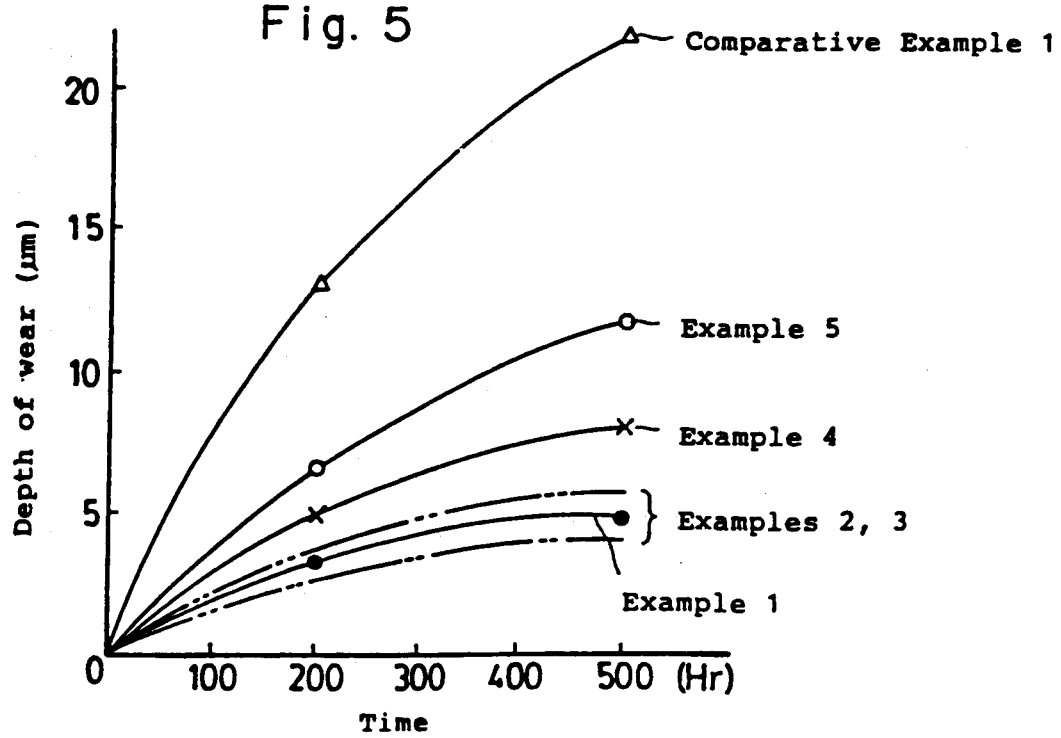
FIG. 5 is a graph showing time course changes of the depth of wear of the bearing material according to this invention using vitreous carbon content as the parameter.

The result is shown in FIG. 5. As the depth of wear in samples (Examples 1-3) containing 50 to 90% by weight of the vitreous carbon is substantially the same, the upper and lower limits thereof are shown by a two-dot chain for simplicity's sake, and the specimen containing 70% by weight of the vitreous carbon (Example 1) alone is shown as a representative. Likewise, the sample of Comparative Example 1 is shown as a typical comparative.

As is evident from the figure, the vitreous carbon content of 30% by weight or more is effective in increasing the wear resistance as compared with the conventional bearing material. Compared to Comparative Example 1, the change in the bore dimension of the bearings or the depth of wear is significantly lower in the specimens containing 30 to 90% by weight of vitreous carbon (Examples 1-5). It is therefore concluded that vitreous carbon is excellent in wear resistance. The effect is more marked when the content is 50% by weight or more.

Heat Resistance Test

Figure 6:
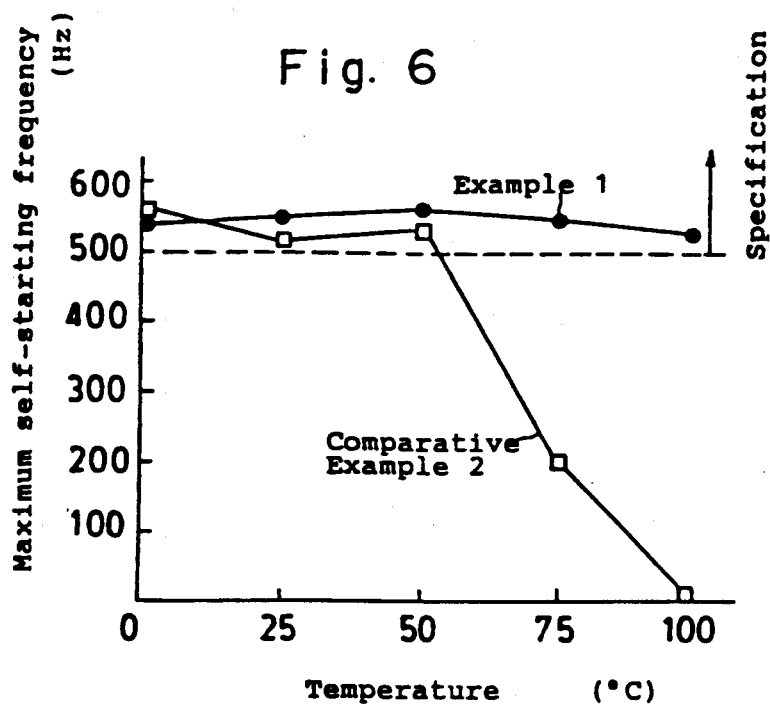
FIG. 6 is a graph comparing the heat resistance of the bearing material according to this invention and a comparative example.

The temperature of the thermostat in which the bearings were placed was varied from 0° C. to 100° C., and the maximum self starting frequency each of the motor located outside the bath for rotating the shaft was measured to confirm whether the requirements of said motor (to vary depending on the use of the motor) were satisfied or not. The maximum rated self-starting frequency of the motor used in the test is 500–600 Hz. The result is shown in FIG. 6. The sample containing 70% by weight of the vitreous carbon (Example 1) is shown as a typical example, and the Comparative Example 2 as a typical comparative example. As is evident from the figure, the Comparative Example 2 deviates from the requirement from about 50° C., while the bearing of the present invention containing 70% by weight of vitreous carbon constantly satisfies the requirement. This is because the present invention bearing in which vitreous carbon is tightly filled does not develop seizure by the dimensional changes caused by the temperature changes. The bearing material according to the present invention is also excellent in the heat resistance.

Slidability Test

Figure 7:
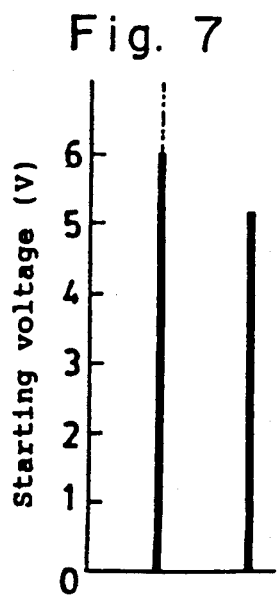
FIG. 7 is a graph comparing the sliding properties of the bearing material according to this invention and a comparative example.

Voltage at the time of starting a motor was measured as it represents the slidability. The result is shown in FIG. 7.

Similarly as in the heat resistance test, the sample containing 70% by weight of vitreous carbon (Example 1) is shown as a typical example, and the Comparative Example 3 is a typical comparative example. As is evident from the figure, whereas the starting voltage in the Comparative Example 3 was 6 V (although the actual value may have been greater than 6 V as the meter used in the test could measure only up to 6 V), the starting voltage of the bearing according to the present invention was 5.2 V. The plastic bearing of Example 1 is lower in friction and requires much lower starting voltage than the conventional plastic bearings of the comparative example. Although not shown in FIG. 7, voltage for starting a motor was about 5.2 V in all of the samples containing 50–90% by weight of vitreous carbon. With the content decrease from 50% by weight to 40% by weight and 30% by weight, a rapid increase in the starting voltage was observed. Thus, bearings containing 30% by weight or more of vitreous carbon, and more particularly 50% by weight or more, have excellent slidability.

These test results indicate that the bearings should contain 30-98% by weight of vitreous carbon and 2-70% by weight of plastics in order for them to at least shown better performance than the conventional products. To obtain bearings that have the higher wear resistance, slidability and heat resistance by a great margin than the conventional products, the content of vitreous carbon should be 50-98% by weight and that of plastics 2 to 50% by weight. The vitreous carbon content which improves all of the characteristics in wear resistance, slidability and heat resistance is between 60 and 80% by weight, and more preferably approximately 70% by weight.

Using said vitreous carbon as a modifier, the following eight bearing members and one comparative sample were molded.

EXAMPLE 6

Spherical particles of vitreous carbon with the mean particle size of 10–30 μm was used as a modifier in an amount of 80% by weight and blended with 20% by weight of phenol resin (Sumulite Resin RP 50590 manufactured by Sumitomo Bakelite Co., Ltd.) as a matrix material and kneaded for uniform dispersion. The 87% by weight the dispersion was added with 8% by weight of silicone base surfactant (NUC Y 7006, Nippon Unica Co., Ltd.) and 5% by weight of diester type liquid grease as the lubricant and further kneaded for thorough dispersion. The complex was subjected to a process similar to that used in Example 1, i.e. the compression molding using the insert molding technique to obtain a bearing member.

EXAMPLE 7

A bearing member was molded by the same method as in Example 1 except that diester type liquid grease of Example 6 was not added.

EXAMPLE 8

A bearing member was molded by the same method as in Example 1 except that urea grease (Nig-Ace W, Nippon Grease Co. Ltd.) was used instead of diester type liquid grease of Example 6.

EXAMPLE 9

A bearing member was molded by the same method as in Example 1 except that an organic surfactant was used instead of the silicone base surfactant of Example 6.

EXAMPLE 10

A bearing member was molded by the same method as in Example 1 except that silane coupling agent (NUC A 187, Nippon Unica Co.) was used instead of the silicone base surfactant of Example 6.

EXAMPLE 11

A bearing member was molded by the same method as in Example 1 except that the vitreous carbon content was modified to 40% by weight, and that 60% by weight of epoxy resin instead of phenol resin was used. The bearing material of this example is added with the silicone base surfactant and the diester base liquid grease as in Example 6.

EXAMPLE 12

A bearing member was molded by the same method as in Example 1 except that the vitreous carbon content was modified to 70% by weight and that of epoxy resin to 30% by weight respectively. The bearing material according to this example is added with the silicone base surfactant and the diester type liquid grease as in Example 6.

EXAMPLE 13

Molding was conducted by the same method as in Example 1 using 20% by weight of phenol resin and 80% by weight of vitreous carbon.

COMPARATIVE EXAMPLE 4

A bearing comprising a plastic alone was molded by the same method as in Example 1.

The above mentioned wear resistance test was conducted on the present invention bearing samples and the comparative example under the same conditions to measure the depth of wear in the bore of the plastic bearings.

Figure 8:
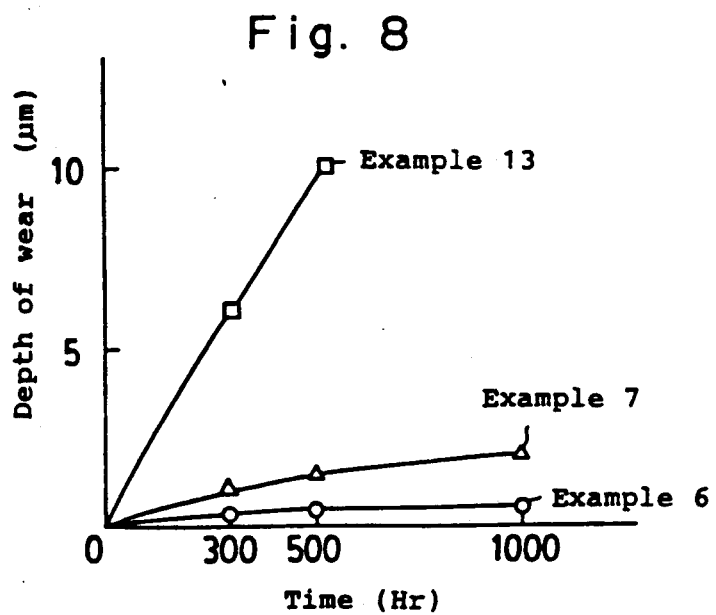
FIG. 8 is a graph showing the time course changes of the depth of wear of the plastic bearing using the composition materials as the parameter.

The result is shown in FIG. 8 and the table below. The representative samples of Examples 6, 7 and 13 are show in FIG. 8. The samples of Examples 6 and 7 were subjected to measurement up to 1000 hours. In the table, those indicated as less than 1 in the depth of wear mean they were actually too small to be measured.

| Specimen No. | Depth of wear (μm) after 200 hrs | after 500 hrs |
| --- | --- | --- |
| Example 6 | less than 1 | less than 1 |
| Example 7 | 1 | 2 |
| Example 8 | less than 1 | less than 1 |
| Example 9 | 1 | 1 |
| Example 10 | less than 1 | less than 1 |
| Example 11 | 3 | 5 |
| Example 12 | less than 1 | less than 1 |
| Example 13 | 4 | 10 |
| Comparative Example 4 | 14 | 20 |

As is clear from the table, the specimens of Examples 6 through 13 containing 2–70% by weight of plastic and 30–98% by weight of vitreous carbon show small wear and are thus excellent in wear resistance compared to the Comparative Example 4 which contains n vitreous carbon. Comparison of Example 13 which is substantially the same as for the main ingredients, i.e. plastic and vitreous carbon, with Examples 6 through 10 clearly indicates that the presence/absence of a surfactant or a coupling agent plays a significant role in reducing the depth of wear.

When Example 13 is compared with Example 11 which contains half as much vitreous carbon as Example 13, the presence of the surfactant is found to be more effective than the vitreous carbon content in increasing the wear resistance.

When Example 11 is compared with Examples 6 through 10 and 12, a composition with a higher vitreous carbon content is more effective in improving the wear resistance if the composition includes a surfactant or a coupling agent. Comparison of Example 6 with Example 7 indicates that presence of a lubricant is less significant in terms of the wear resistance but that its addition is more preferable. Comparison of Example 6 with Comparative Example 8 indicates that difference in the type of grease as the lubricant (diester type liquid grease vs. urea grease) does not affect the wear resistance. Comparison of Example 5 with Example 9 suggests that the difference in the type of surfactant (silicone base and organic) does not affect the ear resistance.

When Example 6 is compared with Example 10, it is understood that either of the surfactant or the coupling agent may be used as an additive. Comparison of Example 6 with Example 12 indicates that the wear resistance hardly varies when different types of plastics were used and the content of vitreous carbon reduced by a small margin. As is also evident from FIG. 8, addition of a surfactant or a coupling agent is effective in improving the long term wear resistance.

As is apparent from the foregoing, the long term wear resistance or preventing vitreous carbon from slipping off from plastics is achieved by the addition of a surfactant or a coupling agent. Addition of a lubricant further enhances the effect. The present inventor found no evidence of vitreous carbon having slipped off from the plastic bearing by observation of the bearing of Example 6 by a microscope after 1,000 hours of operation.

Field of Application

The bearing material and the plastic bearing of the material according to the present invention are excellent in wear resistance slidability and heat resistance. Because the bearing according to the present invention is light in weight and inexpensive in cost, it is widely applicable to various types of bearings, particularly as the bearing for small motors.

What we claim:

1. A plastic bearing, which includes a plastic layer molded integrally with an inner periphery of a metal holder for tight adhesion therewith, wherein said plastic layer has a slidable face in contact with a rotary metal shaft, wherein said plastic layer consists essentially of about 50% by weight to about 90% by weight of vitreous carbon and 50% by weight to about 10% by weight of plastic, as well as about 1 to 7% by weight of the total amount of vitreous carbon and plastic of a surfactant or coupling agent, and optionally wherein said plastic layer further contains about 5-20% by weight of the total amount of vitreous carbon and plastic of a lubricant for increasing the slidability of its slidable face, the vitreous carbon being in powder form having a mean particle size of about 10 to 30 $\mu$m.

* * * * *